United States Patent [19]

Meiffren et al.

[11] Patent Number: 4,982,103
[45] Date of Patent: Jan. 1, 1991

[54] PROCESS AND APPARATUS FOR THE NON-CONTACT MEASUREMENT OF THE GEOMETRIC CONTOURS OF A PART

[75] Inventors: Jean-Luc C. Meiffren, St Germain Les Corbeil; Pierre Pailliotet, Morsang S/Orge; Jean F. Vaerman, Vert St Denis, all of France

[73] Assignee: Societe Nationale d'Etude et de Construction de Moteurs d'Aviation S.N.E.C.M.A., Paris, France

[21] Appl. No.: 282,324

[22] Filed: Dec. 9, 1988

[30] Foreign Application Priority Data

Dec. 9, 1987 [FR] France ............................ 87 17123

[51] Int. Cl.$^5$ ............................................ G01N 21/86
[52] U.S. Cl. ................................. 250/560; 356/376
[58] Field of Search ............. 356/376, 1, 4; 250/560, 250/561

[56] References Cited

U.S. PATENT DOCUMENTS

| | | | |
|---|---|---|---|
| 4,299,491 | 11/1981 | Waters et al. | 356/376 |
| 4,473,750 | 9/1984 | Oshida et al. | 250/560 |
| 4,674,869 | 6/1987 | Pryor | 356/376 |
| 4,708,483 | 11/1987 | Lorenz | 356/376 |
| 4,792,698 | 12/1988 | Pryor | 356/376 |
| 4,794,550 | 12/1988 | Greivenkamp | 356/376 |

FOREIGN PATENT DOCUMENTS 1078108  8/1967  United Kingdom .
1150080  4/1969  United Kingdom .

OTHER PUBLICATIONS

Patent Abstracts of Japan, vol. 11, No. 15 (P-536) [2462], Jan. 16, 1987.

Primary Examiner—David C. Nelms
Assistant Examiner—Sherrie Hsia
Attorney, Agent, or Firm—Oblon, Spivak, McClelland, Maier & Neustadt

[57] ABSTRACT

Process and apparatus for measuring or checking the geometric contours of a part without contact, wherein the part is illuminated by a focussed laser beam and a reflected ray is detected by means of an array of photo diodes, the position of the part and the position of the diode which receives the maximum intensity of the reflected ray being recorded by a computer at each step as the part is moved step by step relative to the incident beam, this data enabling the computer to reconstruct the scanned contour of the part.

17 Claims, 6 Drawing Sheets

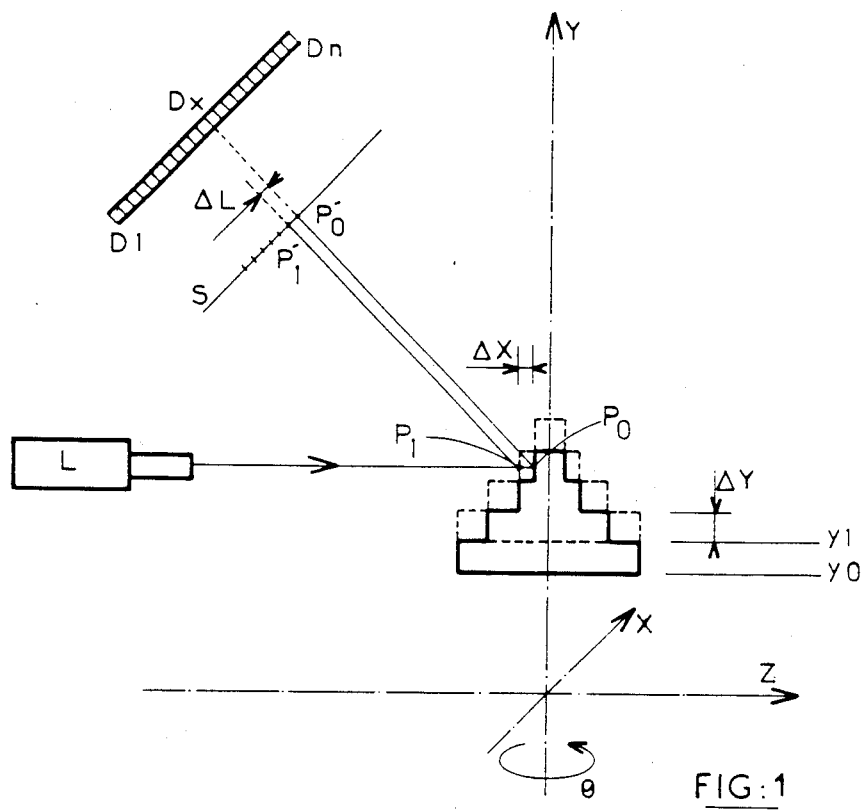
FIG:1
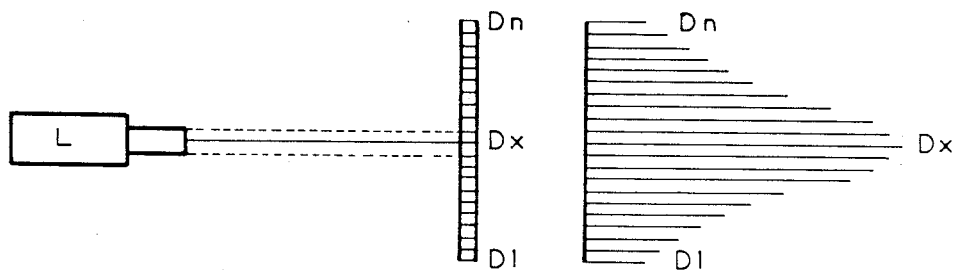
FIG:2

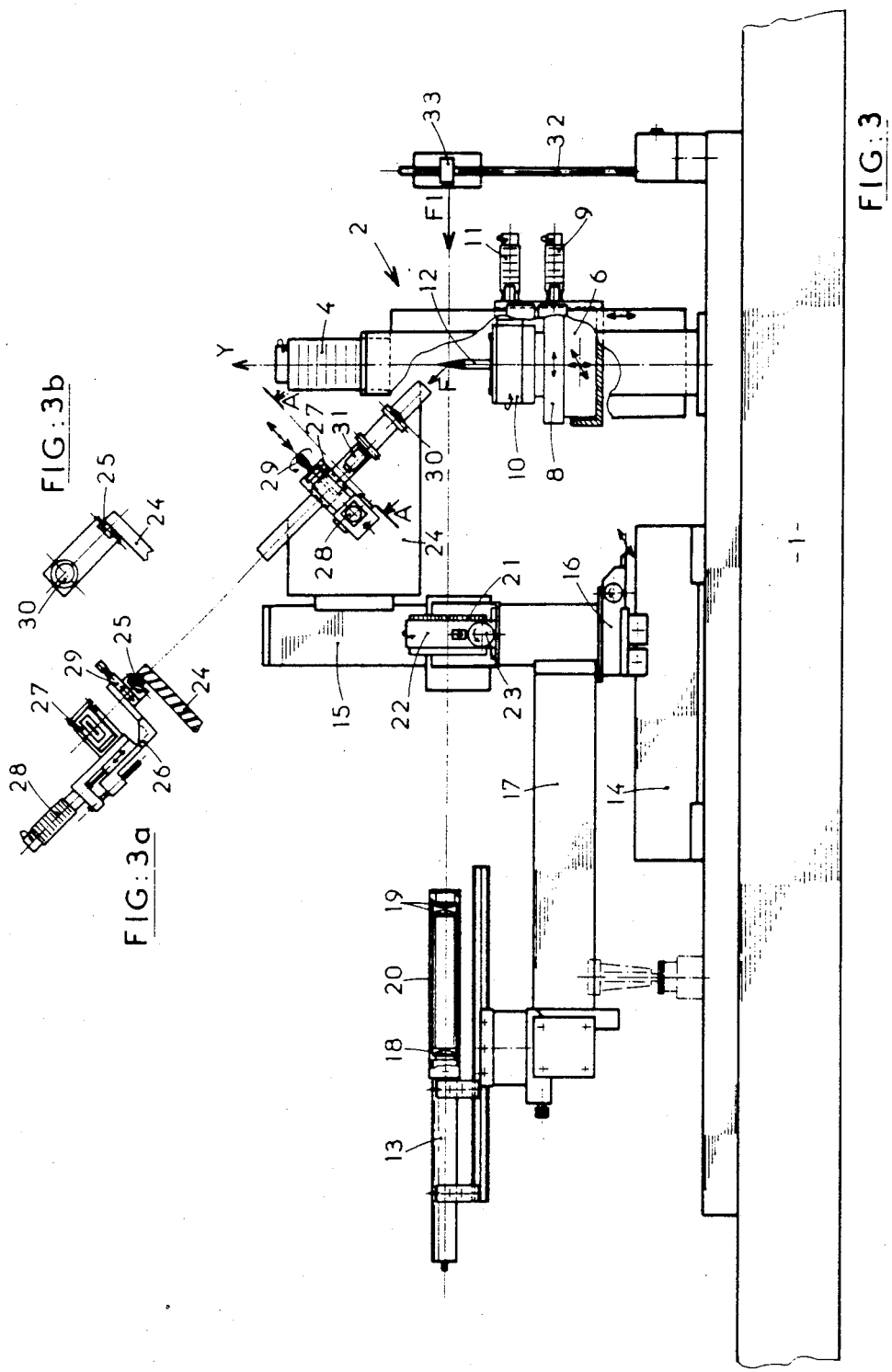

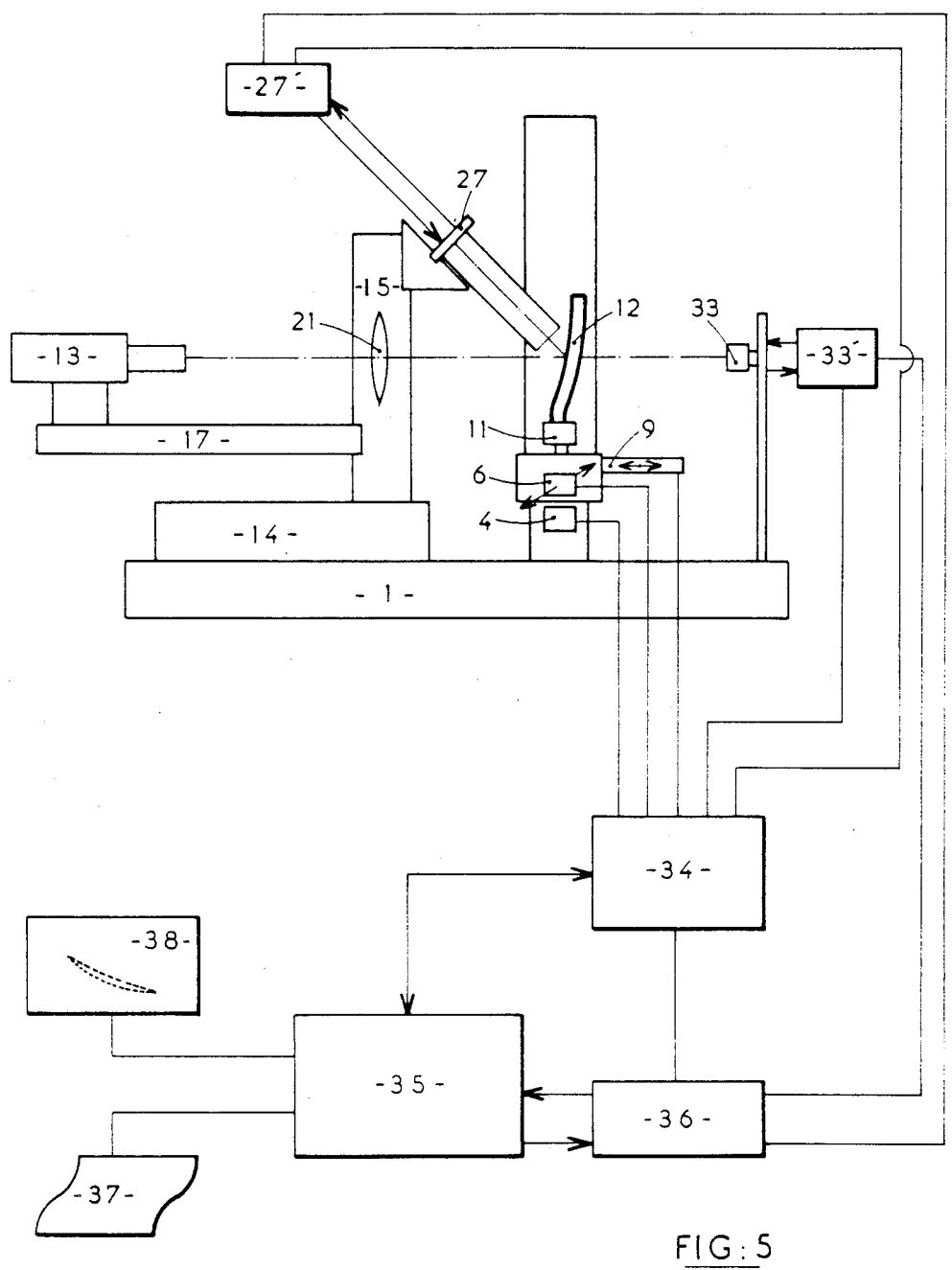
FIG:5

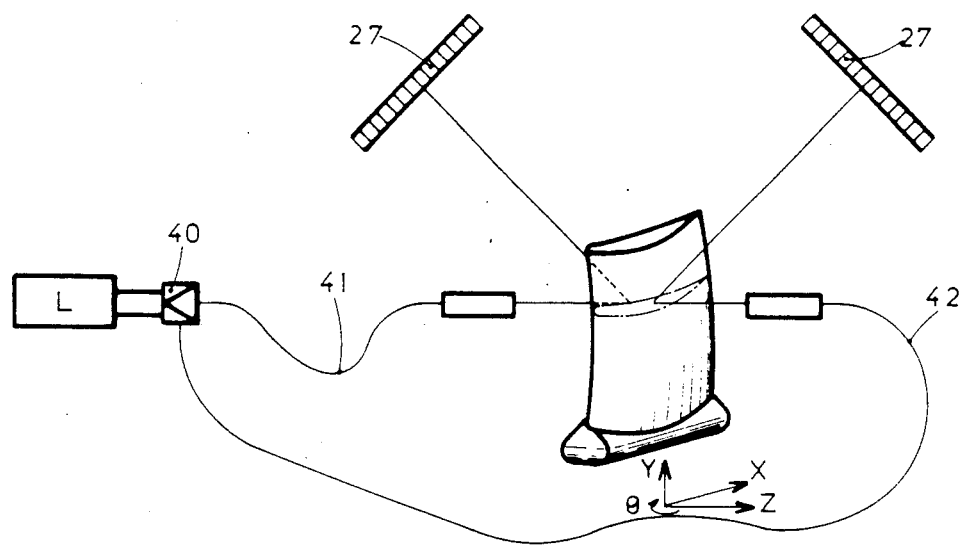
FIG:7
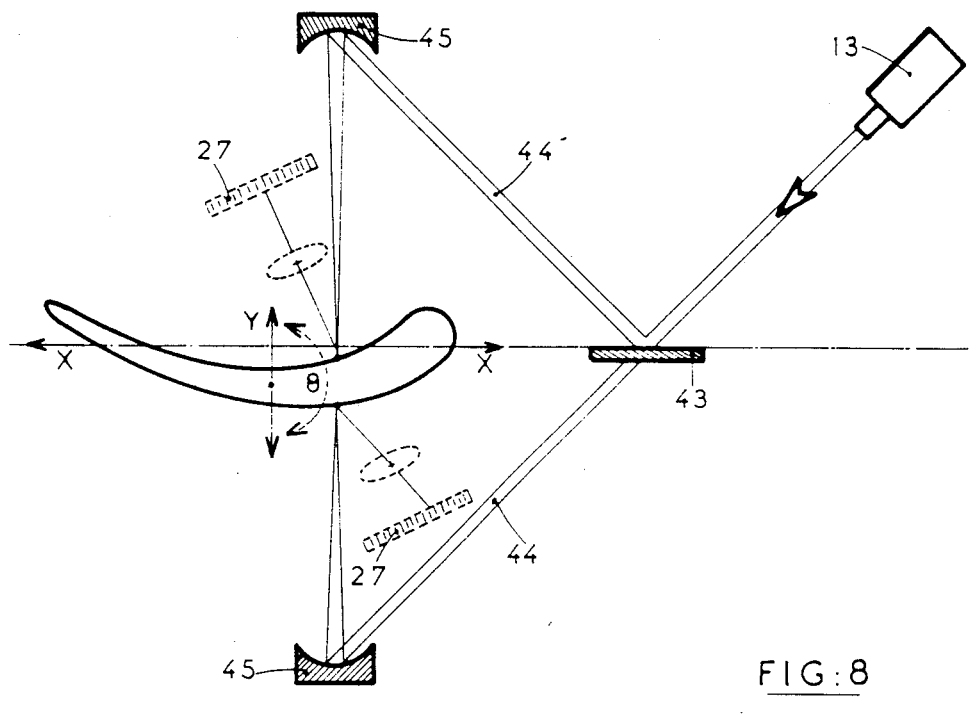
FIG:8

4,982,103

PROCESS AND APPARATUS FOR THE NON-CONTACT MEASUREMENT OF THE GEOMETRIC CONTOURS OF A PART

BACKGROUND OF THE INVENTION

1. Field of the Invention

The present invention relates to a process for the measurement or checking of the geometric contours of a part without physical contact with the part, and to apparatus for carrying out the process.

2. Summary of the Prior Art

The majority of devices known for measuring or checking the geometric contours of a part operate by contact of a sensor with the part and measurement of the displacement of this sensor as a function of the displacement of the part perpendicularly to the sensing direction.

There are cases when this type of checking is not very suitable, for example when the contours to be checked are those of a distorted part, or when the checking rates must proceed evenly, or when the parts to be checked are very brittle.

This last instance is met, for example, in the checking of ceramic cores intended to act as moulding cores in the manufacture of hollow blades for aeronautical use. In the hot parts of turbojet engines (the high pressure turbine for example), blades are used which are cooled by a cooling fluid flowing through cavities of the blade. To make these blades at the foundry ceramic cores are made conforming to the shape of the inner cavities of the blades.

The geometric shape and size of these cores must be extremely uniform, with very little tolerance, as the form of the cores will determine the thickness of the walls of the cast blades and thus their ability to be suitably and evenly cooled. Individual checking is therefore indispensable. However, these cores are extremely fragile, it having been observed statistically that a pressure of 13 grammes exerted by a sensor is sufficient to break or distort them.

SUMMARY OF THE INVENTION

It is therefore an objection of the present invention to provide a method for the non-contact checking of the geometric contours of parts such as, for example, ceramic foundry cores, turbojet engine blades, or any other part requiring checking without contact.

A further object of the invention is to provide a non-contact checking device for carrying out the method, which can be fully automated and permits high checking rates for individual checking of large numbers of parts.

According to one aspect of the invention, there is provided a process for measuring or checking, without contact, the geometric contour of a section of a part capable of reflecting light rays at least partly, including the steps of:

(a) placing said part on a measuring bench having at least three degrees of translational freedom along mutually perpendicular axes X, Y, Z and one degree of rotational freedom about one of said axes Y;

(b) illuminating a point on said part by means of a light source emitting a beam parallel to another of said axes Z and focussed on said part;

(c) receiving rays reflected from said part by means of a photoelectric detector arranged substantially perpendicular to the reflected beam in a plane containing said Y and Z axes, said detector being formed by an array of uniformly spaced photodiodes, termed the measuring array;

(d) recording in a computer the index $i_{dmj}$ of the photodiode in said measuring array receiving the maximum intensity of said reflected beam, and also the position index $i_{xi}$ of said part along the X-axis;

(e) moving said part by one measuring step along said X-axis and repeating steps (b) to (d); and (f) repeating step (e) as many times as is necessary to cover the dimension of said part in the direction of said X-axis.

The section contours may be checked step by step with a constant or variable step pitch, depending on the curvature of the part being checked. Thus, a 4 or 5 mm pitch may be chosen for checking a surface having a large radius of curvature, whereas a smaller pitch of 1 mm to 2 microns ("lens" effect) may be used for highly curved surfaces or surfaces with anomalies, with the part possibly returning to a former position when the system detects that a surface anomaly requires a change from a coarse pitch to a fine pitch.

The process in accordance with the invention enables sections of distorted parts such as blades or ceramic cores to be checked by measuring the contours at the concave and convex surfaces and the leading and trailing edges, and reconstructing the geometry of the part on a tracing table by rotating and joining the successively measured curves.

For this purpose, the process preferably includes the further steps of:

(g) rotating said part about said Y-axis through a predetermined angle and repeating steps (b) to (f); and (h) repeating step (g) sufficient times until the complete profile of said section has been measured. For example, the part may be rotated through angles of 90° so that measurements are taken on four sides of the part. Furthermore, the computer is preferably provided with a graphic output and the curves corresponding to the measurements taken during each angular position of said part are plotted on said graphic output to reconstruct the profile of the measured section of said part.

In order to check the contours of a part over its entire surface, preferably the process includes the further steps of:

(i) moving said part by one measuring step along said Y-axis and repeating steps (b) to (h) to measure the profile of a section of said part parallel to the preceeding section measured; and (j) repeating step (i) until sections have been measured at intervals throughout the height of said part in the direction of said Y-axis.

In this case the measured profiles of successive sections may be plotted and superimposed on said graphic output to reconstruct a three-dimensional spatial view of the geometrical volume of said part.

In some cases it may be possible to use two light sources and measuring arrays on opposite sides of the part so that the computer records the measurements corresponding to the profile of the section at two opposite faces of the part simultaneously.

According to a further aspect of the invention, there is provided apparatus for measuring or checking, without contact, the geometric contour of a section of a part capable of reflecting light rays at least partly by a process according to claim 1, said apparatus comprising:

a bench for supporting said part with at least three degrees of translational freedom with respect to mutually perpendicular axes X, Y, Z and one degree of rotational freedom about one of said axes Y, said bench including a bar a bracket slidable on said bar parallel to said Y-axis, a first table supported on said bracket and slidable parallel to said X-axis, a second table supported on said first table and slidable parallel to said Z-axis, and a circular carrier plate for said part mounted on said second table for rotation about said Y-axis;

a light source for providing a focussed beam of light for illuminating said part on said carrier plate in a direction parallel to said Z-axis;

photoelectric detection means for receiving light rays reflected from said part and including a longitudinal aray of photodiodes disposed substantially at right angles to the said reflected rays in a plane through said Y and Z-axes; and a computer operatively connected to said bench to control the movements of said bracket, said first and second tables, and said carrier plate, and to record position data thereof, said computer also being connected to said photoelectric detection means to record the indices $i_{dmj}$ of the photodiodes which receive the maximum intensity of said reflected rays.

Other characteristics of the process and apparatus in accordance with the invention will become apparent from the following description of the preferred embodiments with reference to the drawings.

BRIEF DESCRIPTION OF THE DRAWINGS

FIG. 1 is an optical triangulation diagram of the principle upon which the invention is based;

FIG. 2 is a diagram illustrating the Gaussian distribution of the illumination of a part by a cylindrical beam;

FIG. 3 is an elevational view of one embodiment of the measuring apparatus in accordance with the invention;

FIG. 3a is a scrap sectional view along line A—A of FIG. 3; FIG. 3b is a scrap view looking in the direction of arrow F in FIG. 3;

FIG. 5 is a diagrammatic representation of the apparatus of FIG. 3, showing the electrical connections and the control and display components;

FIG. 6 is an example of the display on a tracing table obtained using the process of the invention to measure the profile of two sections A—A and B—B of a ceramic core as shown in FIG. 6a;

FIG. 7 is a diagrammatic view illustrating the principle of another embodiment of the apparatus which permits two opposite faces of the same part to be measured simultaneously; and, FIG. 8 is a diagrammatic view of an alternative arrangement for the embodiment of FIG. 7.

DESCRIPTION OF THE PREFERRED EMBODIMENTS

The process in accordance with the invention is based on the fact that the surface of some materials, particularly metal alloys and ceramics, reflects light which is incident tbereon and that, in addition, the illumination intensity produced by a cylindrical beam of light, such as emitted by a laser, has a Gaussian form. Thus, if an array of diodes are illuminated by a beam from a laser L, the intensity distribution of the output signal will be observed to decrease along a probability curve about the central diode centered on the axis of the beam (see FIG. 2).

Thus, if a point on a stepped cylindrical block is illuminated with a focussed laser beam (FIG. 1), the ray which strikes the surface perpendicularly at Po is reflected and can be measured at 45° in the vertical plane and on a surface S at a point P'o characteristic of the position in space of Po. If the block is moved vertically by Δy so that the ray strikes the point Pl of a lower step, the reflected ray will impinge on the surface S at a point P'l which will be characteristic of the position of Pl.

If the surface S is replaced by an array of diodes Dl to Dn, all spaced at the same pitch, the knowledge of the index $i_x$ of the diode $D_x$ receiving the greatest amount of light reflected by the part, as well as the knowledge of the position references of the part with respect to X, Y, Z, θ will make it possible to determine accurately the position in space of the object point Po. Repetition of these measurements step by step (with respect to θ in the assembly of FIG. 1) will enable the curve of the adjacent points Pi to be reconstructed.

Thus, step by step along the same section (Y remaining constant), it will be possible to reconstruct the geometric contour of the section. If the part is not circular as in the example of FIG. 1, but has parallel or pseudo-parallel faces, such as in the case of a turbine blade, the measurements will be made face by face. Thus, after having positioned the part with the concave surface facing the source of light, and scanned the whole concave surface in steps along X, the part will be rotated by 90° to scan the leading edge, and then rotated again by 90° to scan the convex surface, and then again to scan the trailing edge.

If the same operation is repeated for each section of the part after displacement along the vertical axis Y by a step dependent on the desired accuracy of measurement, a full representation of the part can be obtained.

Figure 4:
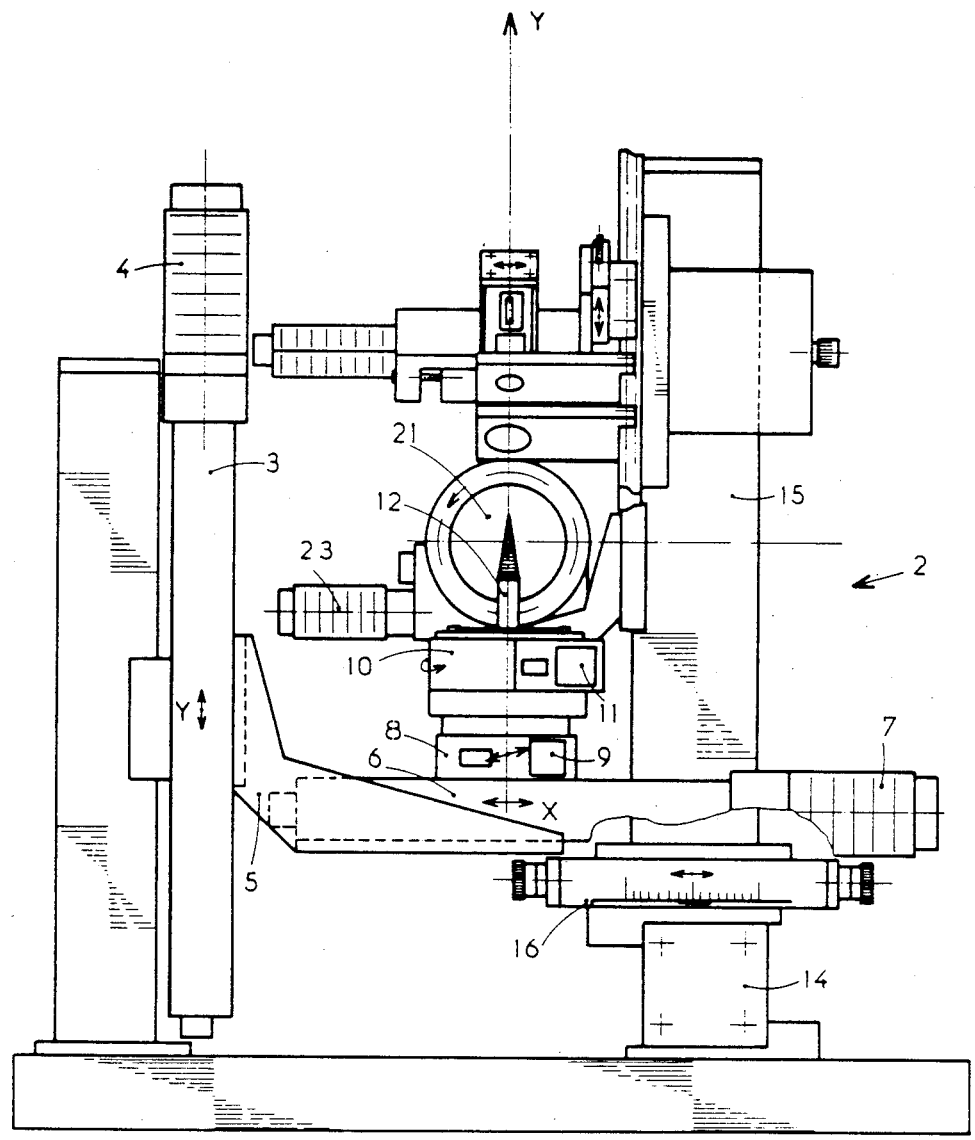
FIG. 4 is an elevational view of the apparatus looking in the direction of arrow Fl in FIG. 3, but to a different scale.

A preferred example of apparatus for putting this basic principle into operation is shown in FIGS. 3 to 5.

A bed 1 supports a bench 2 comprising a vertical beam 3 on which a bracket 5 is able to slide along the vertical axis Y under the action of a motor 4, the bracket 5 supporting a first table 6 which is movable horizontally on the bracket along the axis X by means of a motor 7. The table 6 carries a second horizontal table 8 which can be moved along the horizontal axis Z in steps of 1 micron by means of a motor 9, and mounted on the table 8 is a circular carrier plate 10 which is rotatable about the vertical axis Y in steps of 1/10th of a degree under the action of a motor 11. The part 12 to be measured (in this case a stepped calibrating member) is placed on the carrier plate 10 and therefore has 4 degrees of possible movement X, Y, Z, and θ.

A source of light, consisting here of a helium-neon laser 13 having a wavelength of 630 nm, is mounted on a frame comprising a first horizontal beam 14 on which a vertical beam 15 is mounted so that its position is adjustable along the X-axis by means of an adjustment bracket 16. A second horizontal beam 17 is mounted on the beam 15 and carries the laser 13 at one end. The laser includes a set of lenses 18–19 arranged in a sleeve 20 so as to focus the beam emitted over a 60 micron diameter onto the part, here positioned 800 mm from the lenses 19.

As the laser 13 is of the vertically polarised helium-neon type, a Polaroid filter 21, or any other acousto-optical attenuator such as a Bragg cell, is mounted on a rotary support 22 driven by a motor 23 and hooked onto the vertical beam 15. The Polaroid filter is intended to act as an attenuator so that the intensity of the incident beam emitted by the helium-neon laser can be adjusted.

The vertical beam 15 supports a 45° angle plate 24 in the vertical YZ plane, and the inclined edge of the plate 24 has a rail 25 on which slides an angle bracket 26 carrying an array 27 of photodiodes forming a detecting device. The position of the array 27 is adjustable parallel to the X-axis by means of a motor 28, and perpendicularly to the optical axis of the reflected ray in the vertical plane by means of an adjusting wheel 29.

The rail 25 also carries between the part 12 and the measuring array 27 a lens 30 and a microscope objective 31 with magnification of at least ×25 for amplifying the angular deviation of the reflected ray so to give the measuring array 27, consisting in this example of 1,728 photodiodes at intervals of 10 microns, the sensitivity of measurement that is desired for the system. An array of 1,728 diodes permits the detection of profile fluctuations of 9 mm along the Z-axis, a shift by one diode corresponding to a change in profile of 5 microns. If greater sensitivity is desired, it will be sufficient to increase the magnification of the angular amplifier.

The frame also has a vertical arm 32 carrying a second array 33 of 256 photodiodes arranged perpendicularly to the optical axis of the incident beam and located behind the part 12. This second array, termed the sizing array, is intended to determine, by shadowing, the X-position indices $i_{xl}$ and $i_{xn}$ of the table 6 corresponding to the width of the face of the part to be measured, before the actual measuring is carried out.

Referring to FIG. 5, it will be seen that each of the measuring and sizing arrays 27 and 33 is connected to control electronics 27' and 33' respectively, each synchronized by a clock 34 forming part of a computer 35. The clock 34 also synchronizes the step-by-step control of the motors 4, 6, 9, 11 for the X, Y, Z and $\theta$ movements of the part.

The computer 35 is connected to an analogue-to-digital converter 36 which receives the output signals from the measuring array 27, i.e. the 1,728 illumination amplitude levels $A_i$ of the diodes as well as the 1,728 position indices $i_{dmi}$ of the diodes. The converter 36 also receives similar output signals from the sizing array 33. The computer 35 is also connected to a printer 37 and to a tracing table 38 on which the section profiles of the parts to be measured will be reconstructed.

In operation, the positions of the laser 13 and of the measuring array 27 are first set by placing on the carrier plate 10 a standard 1 mm diameter ball so as to center the beam reflected by the ball onto the central diode of the array, checking by means of the computer the index $i_{dm}$ of the diode which receives the maximum amplitude and moving the array 27 by means of the wheel 29.

A part 12 to be measured is then placed on the carrier plate, and the indices $i_{xl}$ and $i_{xn}$ of the X-axis displacement of the table 6 corresponding to the two sides of the part are found by a shadowing technique. For this purpose, use is made of the sizing array 33, the table 6 being moved in one direction along the X-axis until the incident beam is no longer reflected by the part 12 and is transmitted to the sizing array. The computer then records the index $i_{xl}$ of the table 6, and also the index $i_{dal}$ of the first diode of the sizing array which received the maximum amplitude of the beam. The table is then moved along the X-axis in the opposite direction so that the incident beam is again hidden by the part until the other side of the part is reached. The corresponding indices $i_{xn}$ of the table position and $i_{dan}$ of the sizing array are again recorded by the computer.

From this recorded data $i_{xl}$, $i_{xn}$, $i_{dal}$, $i_{dan}$ the computer is able to establish, using an appropriate program, the dimensions of the part corresponding to the indices $i_{xl}$, $i_{xn}$ between which the measurements subsequently taken by the measuring array 27 correspond to actual points on the geometric contour of the part.

The measuring proper is then carried out. The table 6 is moved step by step from the position corresponding to index $i_{xl}$ to that corresponding to index $i_{xn}$, and at each step the measuring array 27 gives out information on the maximum illumination amplitude and the index $i_{dmj}$ of the diode which received this amplitude, this data being stored by the computer. From the data triplet $i_{xl}$, $i_{dmj}$, and maximum illumination amplitude the system is able to make a point corresponding to the object point of the part. Thus, point by point, the geometric curve of the measured face of the part is reconstructed.

The system is programmed in such a way that for small curvatures the movement along the X-axis is effected in fairly large steps, e.g. 1 mm, and if it detects a substantial change in curvature the forward movement may be modified, e.g. to steps of 1/100th of a mm, so as to provide greater precision of measurement over the highly curved parts.

When the whole of the first face has been measured, i.e. when the computer ascertains that position index $i_{xn}$ has been reached, the computer actuates the motor 11 to rotate the plate carrying the part by 90°. The sizing and measuring operations are then repeated for the face then in the measuring position, and the last two faces are subsequently measured in a similar manner after further 90° rotations of the plate.

If it is desired to measure the geometric volume of a part, successive sections parallel to the XZ-plane are measured in the foregoing manner, with the bracket 5 being shifted one measuring step along the Y-axis after each section has been measured. Then, using the graphic output of the computer, the contour or superimposed contours of each section is plotted to construct a 3-dimensional spatial view of the geometry of the part.

After the computer has recorded all the data required for the point by point reproduction of each face, it will be necessary for it to rearrange, by dephasing over 90°, the four curves obtained in order to plot a complete profile on the tracing table 38.

Figures 6, 6A:
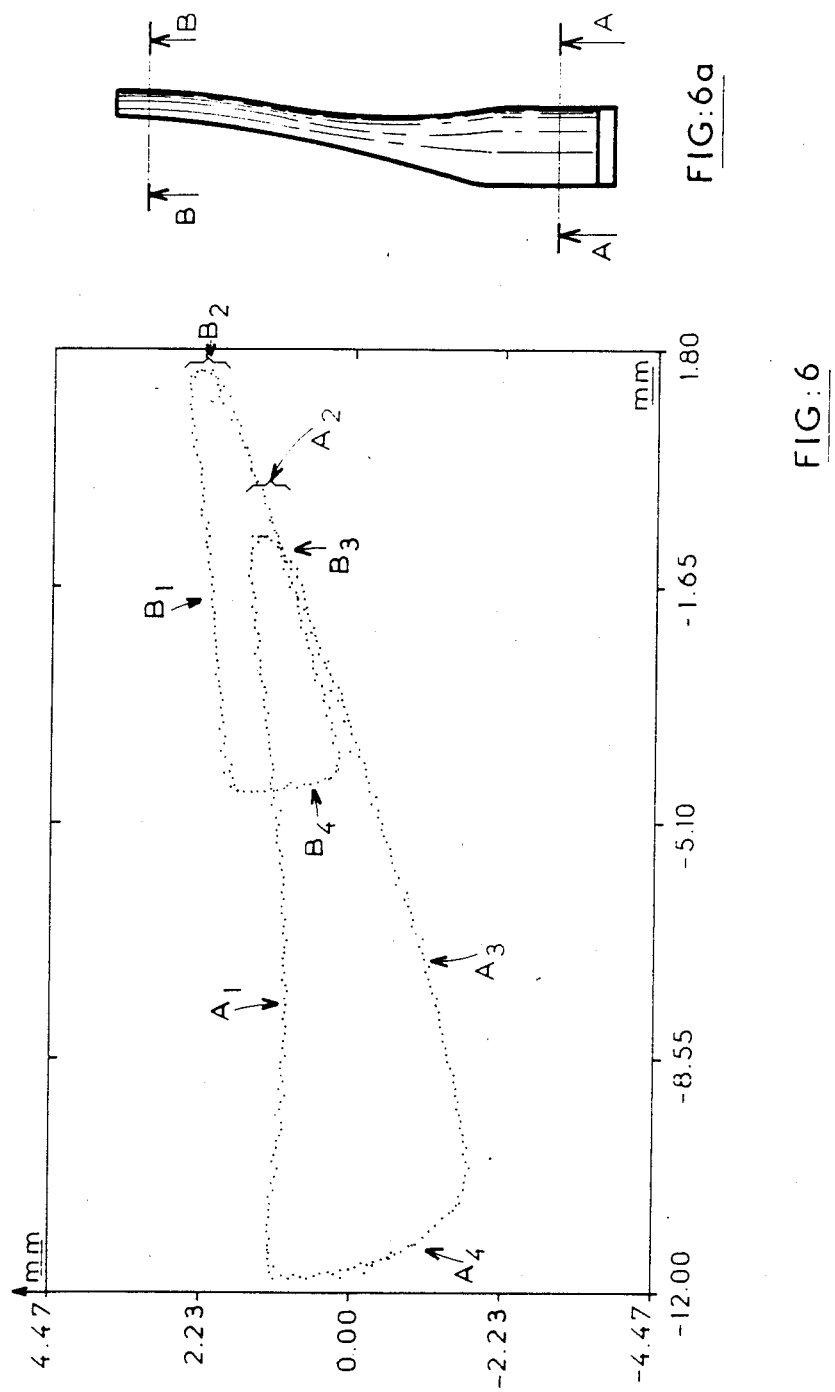

An example of the reconstruction of such curves derived from a foundry core of the general shape shown in FIG. 6a is illustrated in FIG. 6. Each section was measured as described earlier, by measuring in turn each of the faces A1, A2, A3, A4, and then each of the faces B1, B2, B3, B4, each of the reconstructed faces being repositioned by the computer. It will be observed at the intersection of each pair of faces that there are overlapping points of the curves, the accuracy of overlap giving a good idea of the degree of restitution of the geometric contour of each section, the measuring step here having been 1/10th of a mm.

It will be noted also that the apparatus accurately recreates the spatial position of each section, which can be checked by comparing the superimposition of sections A and B and their real positions in FIG. 6a.

While still using the same measurement principle, some variations may be introduced into the apparatus first described. For example, it is possible to check two opposite faces of the same object simultaneously. This may be done in two different ways:

Referring to FIG. 7, the light source L which may be either a helium-neon laser as described earlier, or a laser diode, is equipped with a beam splitter unit 40 feeding two optical fibres 41, 42 for directing two incident beams at opposite faces of the part. The detection device includes two measuring diode arrays 27 on opposite sides of the part, and the software of the computer is adapted for the simultaneous recording of the measurements corresponding to each face.

Referring now to FIG. 8 which shows an alternative arrangement to that of FIG. 7, the beam emitted by the laser 13 is divided in this case by a semi-reflecting mirror 43 into two symmetrical beams 44, 44' which are reflected towards opposite faces of the part by two concave mirrors 45 focussed on the part. As in the previous case, two measuring arrays 27 are provided for detection of the beams reflected from each face.

The process as described hereinbefore is not limited only to applications of visual checking of contours on a graphic reproduction.

Thus, with a simple modification of the computer software, it is possible to correlate the positions of two edges of a part at the same X dimension $i_x$, so as to check the thickness of the part at that dimension $i_x$. This may be effected by inserting, by calculation, an inscribed circle between the two opposite faces of the part, the computer then being arranged simply to print-out an indication of acceptance or rejection of the part.

The same inscribed circle technique may be used to check the radius of curvature of the leading edge or trailing edge of a blade for example, thus permitting verification that the angle of intersection is not sharper than that intended in the definition of the part.

In addition, the examples described have provided for the verification of a section contour either by means of four rotations of the part and measurement of only one face of the part at a time, or by two rotations and simultaneous measurement of two opposite faces. It is quite obvious that the computer software may be adapted to cope with a greater number of rotations, for example six 60° rotations, or eight 45° rotations, or even more, depending on the complexity of the contour to be checked.

What is claimed is:

1. A process for measuring or checking, without contact, the geometric contour of a section of a part capable of reflecting light rays at least partly, including the steps of:
   (a) placing said part on a measuring bench having at least three degrees of translational freedom along mutually perpendicular axes X, Y, Z and one degree of rotational freedom about one of said axes Y;
   (b) illuminating a point on said part by means of a light source emitting a beam parallel to another of said axes Z and focussed on said part:
   (c) receiving rays reflected from said part by means of a photoelectric detector arranged substantially perpendicular to the reflected beam in a plane containing said Y and Z axes, said detector being formed by an array of uniformly spaced photodiodes, termed the measuring array;
   (d) recording in a computer the index $i_{dmj}$ of the photodiode in said measuring array receiving the maximum intensity of said reflected beam, and also the position index $i_{xi}$ of said part along the X-axis;
   (e) moving said part by one measuring step along said X-axis and repeating steps (b) to (d); and
   (f) repeating step (e) as many times as is necessary to cover the dimension of said part in the direction of said X-axis.

2. A process according to claim 1, including the further steps of:
   (g) rotating said part about said Y-axis through a predetermined angle and repeating steps (b) to (f); and
   (h) repeating step (g) sufficient times until the complete profile of said section has been measured.

3. A process according to claim 2, wherein said computer is provided with a graphic output and the curves corresponding to the measurements taken during each angular position of said part are plotted on said graphic output to reconstruct the profile of the measured section of said part.

4. A process according to claim 3, including the further steps of:
   (i) moving said part by one measuring step along said Y-axis and repeating steps (b) to (h) to measure the profile of a section of said part parallel to the preceeding section measured; and
   (j) repeating step (i) until sections have been measured at intervals throughout the height of said part in the direction of said Y-axis, the measured profiles of said sections being plotted and superimposed on said graphic output to reconstruct a three-dimensional spatial view of the geometrical volume of said part.

5. A process according to claim 1 wherein, prior to carrying out the measuring steps (b) to (f), the position indices $i_{xl}$ and $i_{xn}$ corresponding to each edge of said part along said X-axis are determined by shadowing using an array of photodetectors placed behind the part and facing the incident beam from said light source, the said indices $i_{xl}$ and $i_{xn}$ being recorded by said computer to enable the computer to determine which of the measurements made with said measuring array correspond to actual points on the outline of said part.

6. A process according to claim 1, wherein two light sources and measuring arrays are used on opposite sides of said part, and said computer records the measurements corresponding to the profile of the section at two opposite faces of the part simultaneously.

7. Apparatus for measuring or checking, without contact, the geometric contour of a section of a part capable of reflecting light rays at least partly by a process according to claim 1, said apparatus comprising:
   a bench for supporting said part with at least three degrees of translational freedom with respect to mutually perpendicular axes X, Y, Z and one degree of rotational freedom about one of said axes Y, said bench including
   a bar
   a bracket slidable on said bar parallel to said Y-axis,
   a first table supported on said bracket and slidable parallel to said X-axis,
   a second table supported on said first table and slidable parallel to said Z-axis, and
   a circular carrier plate for said part mounted on said second table for rotation about said Y-axis; a light source for providing a focussed beam of light for illuminating said part on said carrier plate in a direction parallel to said Z-axis;

photoelectric detection means for receiving light rays reflected from said part and including a longitudinal measuring array of photodiodes disposed substantially at right angles to the said reflected rays in a plane through said Y and Z-axes; and a computer operatively connected to said bench to control the movements of said bracket, said first and second tables, and said carrier plate, and to record position data thereof, said computer also being connected to said photoelectric detection means to record the indices $i_{dmj}$ of the photodiodes which receive the maximum intensity of said reflected rays.

8. Apparatus according to claim 7, wherein said computer has a tracing table connected to an output thereof for plotting the curves corresponding to the measurements taken from the profile of each measured section.

9. Apparatus according to claim 7, wherein said light source comprises a helium-neon gas laser fitted with a polarizer.

10. Apparatus according to claim 7, wherein said light source comprises a laser diode provided with at least one optical fibre for transmitting the light beam towards said part.

11. Apparatus according to claim 10, wherein said laser diode is provided with a splitter unit and two optical fibres for the transmission of two light beams to illuminate two faces of said part at the same time.

12. Apparatus according to claim 7, wherein said measuring array consists of 1,728 photodiodes uniformly spaced from each other.

13. Apparatus according to claim 12, wherein said photoelectric detection means includes a lens having a magnification ratio of at least 25 for amplifying the angular deviation of said reflected ray received by said measuring array.

14. Apparatus according to claim 11, wherein said photoelectric detection means includes two photodiode measuring arrays placed one at each side of said part illuminated by said light beams for simultaneous measurement of two faces of said part.

15. Apparatus according to claim 7, including an additional array of photodetectors, termed the sizing array, mounted to face the incident beam from said light source at a position behind said part, said computer being connected to said sizing array and adapted to determine the position indices $i_{xl}$ and $i_{xn}$ corresponding to each edge of the part from the shadow created on said sizing array when said part is moved along the X axis between the incident beam and said sizing array.

16. Apparatus according to claim 15, including:
a support bed on which said bench is mounted;
a first horizontal bar mounted on said support bed parallel to said Z-axis;
a second horizontal bar supported by said first horizontal bar parallel thereto and adjustable in a direction parallel to said X-axis, said light source being mounted on said second horizontal bar;
a vertical post for supporting said photoelectric detection means, said vertical post including a support which is adjustable in height on said post and has means oriented at 45° for carrying said measuring array, said support also having means for the distance adjustment of the measuring array on the optical axis of the reflected beam;
a polarizer support mounted on said vertical post and adjustable in height thereon; and
support means for said sizing array mounted on said support bed at the opposite end of said bed from said light source.

17. Apparatus according to claim 16, further including means for calibrating the object surface of said part, said means being formed by a standard ball for placement at the centre of said carrier plate to supply a spatial reference for setting the optical reception axis for the beam reflected by the object surface.

* * * * *